(12) United States Patent
Yoshii

(10) Patent No.: US 12,384,929 B2
(45) Date of Patent: Aug. 12, 2025

(54) INKJET INK AND INKJET RECORDING APPARATUS

(71) Applicant: KYOCERA Document Solutions Inc., Osaka (JP)

(72) Inventor: Tatsuhiko Yoshii, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 180 days.

(21) Appl. No.: 18/495,686

(22) Filed: Oct. 26, 2023

(65) Prior Publication Data

US 2024/0166903 A1    May 23, 2024

(30) Foreign Application Priority Data

Oct. 28, 2022 (JP) .................... 2022-173783

(51) Int. Cl.
| | | |
|---|---|---|
| C09D 11/322 | (2014.01) | |
| B41J 2/01 | (2006.01) | |
| C09D 11/037 | (2014.01) | |

(52) U.S. Cl.
CPC .............. C09D 11/322 (2013.01); *B41J 2/01* (2013.01); *C09D 11/037* (2013.01)

(58) Field of Classification Search
CPC ... C09D 11/322; C09D 11/107; C09D 11/326; C09D 11/38; C09D 11/037; B41J 2/16585; B41J 2/01; B41J 2/155; B41J 2/2146; B41M 5/0023; C09B 48/00

See application file for complete search history.

(56) References Cited

U.S. PATENT DOCUMENTS

| | | | |
|---|---|---|---|
| 2023/0102004 A1* | 3/2023 | Kikutsuji | C09D 11/326 522/42 |
| 2024/0026174 A1* | 1/2024 | Ozawa | B41J 2/2146 |
| 2024/0026175 A1* | 1/2024 | Inoue | C09D 11/107 |
| 2024/0182732 A1* | 6/2024 | Nakanishi | C09D 11/322 |

FOREIGN PATENT DOCUMENTS

JP    2000-273383 A    10/2000

* cited by examiner

*Primary Examiner* — John P Zimmermann
(74) *Attorney, Agent, or Firm* — Studebaker Brackett PLLC

(57) ABSTRACT

An inkjet ink contains a quinacridone pigment, a pigment dispersion resin, and an aqueous medium. The pigment dispersion resin includes an adsorption resin adsorbed to the quinacridone pigment and a non-adsorption resin not adsorbed to the quinacridone pigment. The non-adsorption resin has a percentage content in the pigment dispersion resin of at least 20% by mass and no greater than 50% by mass. A supernatant obtained by centrifugation of the inkjet ink at 1,050,000 G for 3 hours has a phosphorous concentration of at least 1.0 ppm and no greater than 6.0 ppm. The supernatant has a sulfur concentration of at least 1.0 ppm and no greater than 6.0 ppm.

10 Claims, 4 Drawing Sheets

INKJET INK AND INKJET RECORDING APPARATUS

INCORPORATION BY REFERENCE

The present application claims priority under 35 U.S.C. § 119 to Japanese Patent Application No. 2022-173783, filed on Oct. 28, 2022. The contents of this application are incorporated herein by reference in their entirety.

BACKGROUND

The present disclosure relates to an inkjet ink and an inkjet recording apparatus.

Inkjet inks are ejected from recording heads included in an inkjet recording apparatus. There is a demand for ejection stability of the inkjet inks from the recording heads. To meet such a demand, an inkjet recording liquid containing a water-based pigment dispersion is proposed as one example of the inkjet inks. The water-based pigment dispersion contains an aqueous liquid, a quinacridone pigment dispersed in the aqueous liquid, a water-soluble quinacridone derivative adsorbed to the surface of the quinacridone pigment, and a water-soluble quinacridone derivative not adsorbed thereto.

SUMMARY

An inkjet ink according to an aspect of the present disclosure contains a quinacridone pigment, a pigment dispersion resin, and an aqueous medium. The pigment dispersion resin includes an adsorption resin adsorbed to the quinacridone pigment and a non-adsorption resin not adsorbed to the quinacridone pigment. The non-adsorption resin has a percentage content in the pigment dispersion resin of at least 20% by mass and no greater than 50% by mass. A supernatant obtained by centrifugation of the inkjet ink at 1,050,000 G for 3 hours has a phosphorous concentration of at least 1.0 ppm and no greater than 6.0 ppm. The supernatant has a sulfur concentration of at least 1.0 ppm and no greater than 6.0 ppm.

An inkjet recording apparatus according to another aspect of the present disclosure includes a conveyance section that conveys a recording medium and a recording head that ejects an ink toward the recording medium. The ink is the aforementioned inkjet ink.

DETAILED DESCRIPTION

Figure 1:
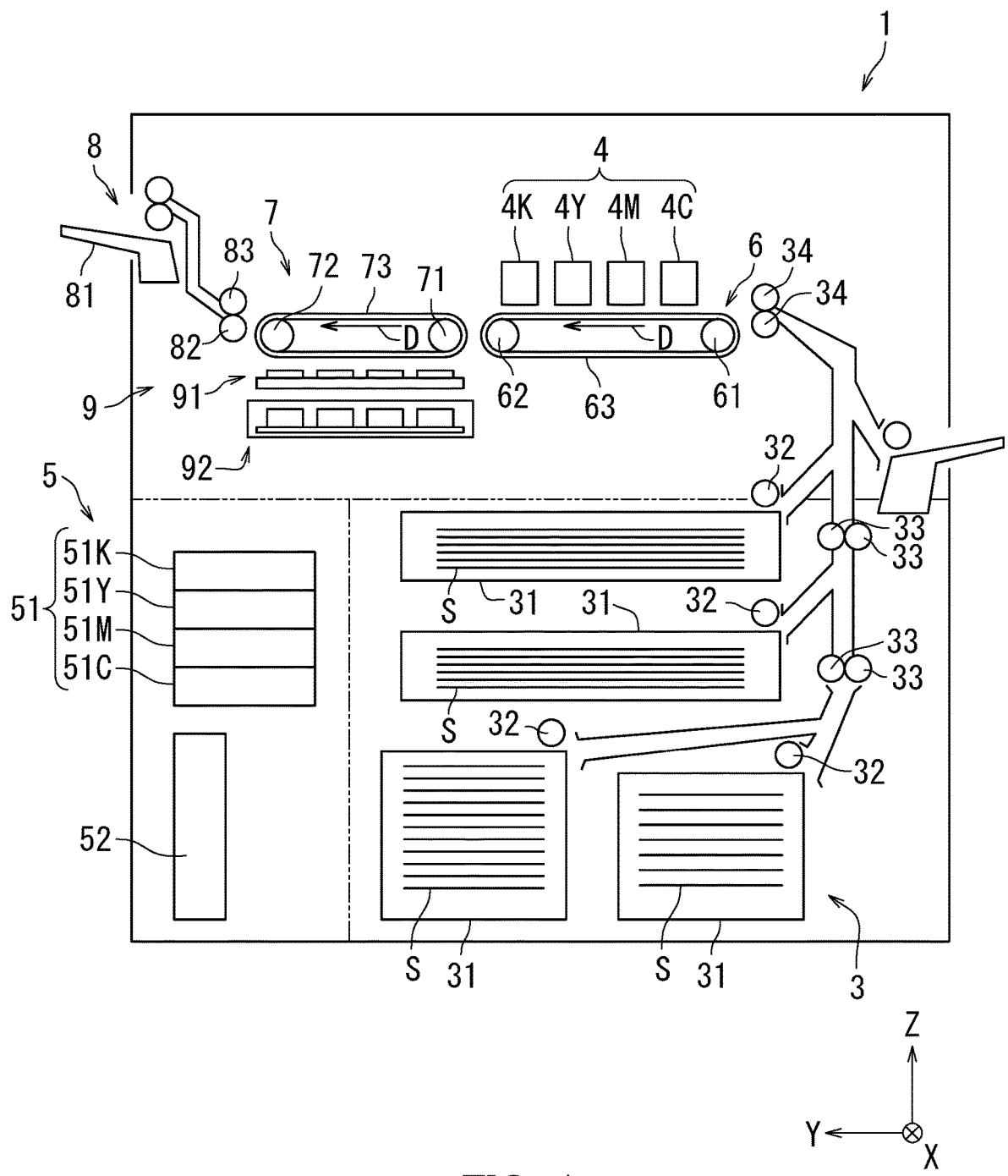
FIG. 1 illustrates an example of an inkjet recording apparatus according to a second embodiment of the present disclosure.

The following described embodiments of the present disclosure. Terms used in the present specification are explained first. The values for volume median diameter ($D_{50}$) are values as measured using a dynamic light scattering type particle size distribution analyzer (e.g., "ZETA-SIZER (registered Japanese trademark) NANO ZS", product of Malvern Instruments Ltd.) unless otherwise stated. The values for acid value are values as measured in accordance with "the Japanese Industrial Standards (JIS) K0070:1992" unless otherwise stated. The values for mass average molecular weight (Mw) are values as measured using gel permeation chromatography unless otherwise stated. The values for viscosity of an ink are values as measured in an environment at 25° C. by a method in compliance with the method described in the "Japanese Industrial Standards (JIS) Z8803:0211, Methods for viscosity measurement of liquid" unless otherwise stated. In the present specification, the term "(meth)acryl" may be used as a generic term for both acryl and methacryl. The phrase "each represent, independently of one another," in description about formulas means possibly representing the same group or different groups. One type of each component described in the present specification may be used independently, or two or more types of the component may be used in combination.

First Embodiment: Inkjet Ink

The following describes an inkjet ink (also referred to below simply as an ink) according to a first embodiment of the present disclosure.

The ink of the first embodiment contains a quinacridone pigment, a pigment dispersion resin, and an aqueous medium. The pigment dispersion resin includes an adsorption resin adsorbed to the quinacridone pigment and a non-adsorption resin not adsorbed to the quinacridone pigment. The non-adsorption resin has a percentage content in the pigment dispersion resin of at least 20% by mass and no greater than 50% by mass. A supernatant obtained by centrifugation of the ink at 1,050,000 G for 3 hours has a phosphorous concentration of at least 1.0 ppm and no greater than 6.0 ppm. The supernatant obtained by centrifugation of the ink at 1,050,000 G for 3 hours has a sulfur concentration of at least 1.0 ppm and no greater than 6.0 ppm.

In the following, the percentage content of the non-adsorption resin in the pigment dispersion resin may be referred to a "non-adsorption resin rate". Furthermore, the sulfur concentration in the supernatant obtained by centrifugation of the ink at 1,050,000 G for 3 hours may be referred to as a "specific sulfur concentration". Also, the phosphorous concentration in the supernatant obtained by centrifugation of the ink at 1,050,000 G for 3 hours may be referred to as a "specific phosphorous concentration".

With the ink of the first embodiment having the above features: occurrence of skewed ink ejection from a recording head can be inhibited; images with excellent scratch resistance can be formed; the ink can be excellent in re-solubility; and the quinacridone pigment can be excellent in dispersibility therein. The reasons thereof are presumed as follows.

For easy understanding, the outline of a quinacridone pigment synthesis method is described first. The quinacridone pigment is a compound represented by formula (20), for example. The quinacridone pigment is synthesized through a reaction represented by chemical equation (r-1), for example.

[Chemical formula 1]

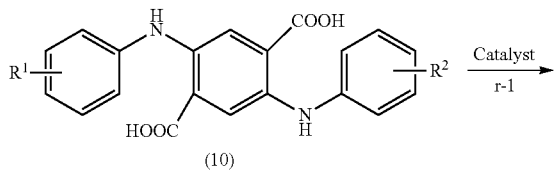

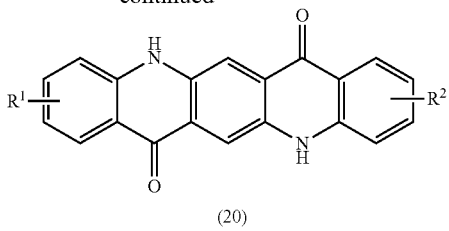

(20)

In formulas (10) and (20), $R^1$ and $R^2$ each represent, independently of one another, a monovalent group. In the following, the "reaction represented by chemical equation (r-1)" may be also referred to below as a "reaction (r-1)". Also, the "compounds represented by formula (10) and formula (20)" may be also referred to below as a "compound (10)" and a "compound (20)", respectively. Where $R^1$ and $R^2$ each represent a methyl group, the compound (20) is C.I. Pigment Red 122. Where $R^1$ and $R^2$ each represent a hydrogen atom, the compound (20) is C.I. Pigment Violet 19.

In reaction (r-1), the compound (20) is obtained by reacting the compound (10) using a catalyst. The catalyst used in reaction (r-1) includes a phosphorous-containing catalyst, for example. The quinacridone pigment synthesis method has been described so far.

The phosphorous-containing catalyst used in reaction (r-1) may remain in the quinacridone pigment as an impurity. As a result of containing the quinacridone pigment, the ink contains the phosphorous-containing catalyst.

Furthermore, the quinacridone pigment hardly disperses in an aqueous medium, and therefore a sulfur compound (e.g., a derivative of a quinacridone pigment having a sulfur atom) may be added to the quinacridone pigment as a dispersant. In the following, the "derivative of the quinacridone pigment having a sulfur atom" may be also referred to below as a "sulfur-containing pigment derivative". As a result of containing a quinacridone pigment to which the sulfur compound has been added, the ink contains the sulfur compound.

The quinacridone pigment hardly disperses in an aqueous medium. Therefore, a pigment dispersion resin may be added to the ink. The pigment dispersion resin includes a adsorption resin adsorbed to the quinacridone pigment and a non-adsorption resin not adsorbed to the quinacridone pigment. The adsorption resin disperses the quinacridone pigment in the aqueous medium. The non-adsorption resin is free in the aqueous medium, for example.

The polarity of each of the phosphorous-containing catalyst, the sulfur compound, and the non-adsorption resin is relatively high. As such, when images are formed with the ink containing the quinacridone pigment, the phosphorous-containing catalyst, the sulfur compound, and the non-adsorption resin may electrostatically adhere to the ejection surfaces and the nozzle orifice inner walls of the recording head. The adhering phosphorous-containing catalyst, sulfur compound, and non-adsorption resin serve as a cause of skewed ink ejection from the recording head.

In view of the foregoing, the specific phosphorous concentration is set to no greater than 6.0 ppm in the ink of the first embodiment. When the specific phosphorous concentration is no greater than 6.0 ppm, which means a relatively small amount of the phosphorous-containing catalyst being an impurity, occurrence of skewed ink ejection from the recording head can be inhibited. The specific sulfur concentration is set to no greater than 6.0 ppm in the ink of the first embodiment. When the specific sulfur concentration is no greater than 6.0 ppm, which means a relatively small amount of the sulfur compound, occurrence of skewed ink ejection from the recording head can be inhibited. Furthermore, the non-adsorption resin rate is set to no greater than 50% by mass in the ink of the first embodiment. When the ink has a non-adsorption resin rate of no greater than 50% by mass, which means a relatively small amount of the non-adsorption resin, occurrence of skewed ink ejection from the recording head can be inhibited.

By contrast, when a trace amount of the phosphorous-containing catalyst, which is an impurity though, is contained in the ink, re-solubility of the ink increases. In view of the foregoing, the specific phosphorous concentration is set to at least 1.0 ppm in the ink of the first embodiment. When the specific phosphorous concentration is at least 1.0 ppm, re-solubility of the ink increases. Note that in the present specification, re-solubility of the ink means a characteristic of the ink with which the ink that has dried as a result of attaching to the ejection surfaces of the recording head easily dissolves in either or both a cleaning solution and a purged ink.

Furthermore, the specific sulfur concentration is set to at least 1.0 ppm in the ink of the first embodiment. An ink with a specific sulfur concentration of at least 1.0 ppm contains a sufficient amount of the sulfur compound being for example a dispersant. The pigment particles accordingly have a small particle diameter, with a result that the pigment particles are less likely to precipitate. As a result, the pigment particles containing the quinacridone pigment favorably disperses in the aqueous medium.

When the ink is ejected toward a recording medium from the recording head, binding force between the recording medium and the quinacridone pigment contained in the ink tends to increase in presence of the non-adsorption resin. In view of the foregoing, the non-adsorption resin rate is set to at least 20% by mass in the ink of the first embodiment. Binding force between the recording medium and the quinacridone pigment in the ink with a non-adsorption resin rate of at least 20% by mass increases, thereby achieving formation of images with excellent scratch resistance.

The reasons have been described so far why with the ink of the first embodiment, occurrence of skewed ink ejection from the recording head can be inhibited, why images with excellent scratch resistance can be formed, why the ink can be excellent in re-solubility, and why the quinacridone pigment can be excellent in dispersibility therein. The ink of the first embodiment is described further in detail below.

<Specific Phosphorous Concentration>

The specific phosphorous concentration of the ink of the first embodiment is described first. As described previously, the specific phosphorous concentration is at least 1.0 ppm and no greater than 6.0 ppm. In order to further increase re-solubility, the specific phosphorous concentration is preferably at least 2.0 ppm, more preferably at least 3.0 ppm, and further preferably at least 5.0 ppm. In order to further inhibit skewed ink ejection from the recording head, the specific phosphorous concentration is preferably no greater than 5.0 ppm, more preferably no greater than 3.0 ppm, and further preferably no greater than 2.0 ppm.

The specific phosphorous concentration is a concentration of a phosphorous atom derived from the phosphorous-containing catalyst used for synthesis of the quinacridone pigment. That is, the specific phosphorous concentration is a concentration of the phosphorous atom of the phosphorous-containing catalyst contained in the supernatant, for example.

The phosphorous-containing catalyst used for synthesis of the quinacridone pigment is at least one selected from the group consisting of polyphosphoric acid and a derivative thereof, for example. More specifically, the specific phosphorous concentration is a concentration of a phosphorous atom of at least one selected from the group consisting of polyphosphoric acid and a derivative thereof. In the following, the "at least one selected from the group consisting of polyphosphoric acid and a derivative thereof" may be also referred to below as polyphosphoric acids".

Examples of the derivative of polyphosphoric acid among the polyphosphoric acids include polyphosphate esters, and more specific examples include polyphosphoric acid alkyl esters. A preferable polyphosphoric acid alkyl ester is polyphosphoric acid methyl ester. The catalyst used in reaction (r-1) may further includes a metal catalyst such as tin in addition to the phosphorous-containing catalyst.

The specific phosphorous concentration can be reduced by removing at least a portion of the phosphorous-containing catalyst remaining in the quinacridone pigment by for example ultrafiltration. For example, the specific phosphorous concentration can be adjusted by changing the pigment dispersion circulation time in ultrafiltration of the pigment dispersion. The longer the pigment dispersion circulation time is, the lower the specific phosphorous concentration tends to be. The specific phosphorous concentration is measured by a method described in Examples, for example. The specific phosphorous concentration of the ink of the first embodiment has been described so far.

The components contained in the ink of the first embodiment are described next. The ink of the first embodiment contains at least a quinacridone pigment, a pigment dispersion resin, and an aqueous medium, for example. Preferably, the ink further contains a sulfur compound (e.g., the sulfur-containing pigment derivative) as necessary. The sulfur compound constitutes a pigment composition together with the quinacridone pigment. The ink of the first embodiment may further contain a surfactant and an additional component as necessary. The pigment composition, the pigment dispersion resin, the aqueous medium, the surfactant, and the additional component are described below.

<Pigment Composition>

The pigment composition includes a quinacridone pigment and a sulfur compound. The quinacridone pigment and the sulfur compound are described below.

(Quinacridone Pigment)

Examples of the quinacridone pigment include C.I. Pigment Violet (19 or 42), C.I. Pigment Red (122, 202, 206, 207, or 209), and C.I. Pigment Orange (48 or 49).

Examples of commercially available quinacridone pigments include "TRM-11" produced by Dainichiseika Color & Chemicals Mfg. Co., Ltd., "CINQUASIA (registered Japanese trademark) MAGENTA D4550" produced by BASF, "CINQUASIA (registered Japanese trademark) PINK D4450" produced by BASF, "INKJET MAGENTA E-S" produced by Clariant (Japan) K.K., "HOSTAPERM PINK E 02" produced by Clariant (Japan) K.K., "HOSTAPERM RED E3B" produced by Clariant (Japan) K.K., and "HOSTAPERM RED E5B 02" produced by Clariant (Japan) K.K.

The quinacridone pigment has a percentage content in the ink of preferably at least 1% by mass and no greater than 12% by mass, and more preferably at least 4% by mass and no greater than 8% by mass. As a result of the percentage content of the quinacridone pigment being set to at least 1% by mass, images with desired image density can be formed with the ink. As a result of the percentage content of the quinacridone pigment being set to no greater than 12% by mass, fluidity of the ink can be optimized. The ink may contain only the quinacridone pigment as a pigment. Alternatively, the ink may further contain a pigment other than the quinacridone pigment in addition to the quinacridone pigment as a pigment in order to adjust hue of the ink. The percentage content of the quinacridone pigment in the pigments is preferably at least 80% by mass, more preferably at least 90% by mass, and further preferably 100% by mass.

(Sulfur Compound)

Adsorption of the sulfur compound to the quinacridone pigment makes the quinacridone pigment to disperse in the aqueous medium. The specific sulfur concentration is a concentration of a sulfur atom of the sulfur compound (e.g., the sulfur-containing pigment derivative, more specifically, a sulfur compound represented by formula (1) described later), for example.

As described previously, the specific sulfur concentration is at least 1.0 ppm and no greater than 6.0 ppm. In order to more favorably disperse the quinacridone pigment in the aqueous medium, the specific sulfur concentration is preferably at least 1.5 pm, more preferably at least 2.0 ppm, further preferably at least 3.0 ppm, and further more preferably at least 5.0 ppm. In order to further inhibit skewed ink ejection from the recording head, the specific sulfur concentration is preferably no greater than 5.0 ppm, more preferably no greater than 3.0 ppm, further preferably no greater than 2.0 ppm, and further more preferably no greater than 1.5 ppm.

For example, the specific sulfur concentration can be adjusted by changing the content ratio of the sulfur compound to the total mass of the quinacridone pigment and the sulfur compound. The lower the content ratio of the sulfur compound to the total mass of the quinacridone pigment and the sulfur compound is, the lower the specific sulfur concentration tends to be. The content ratio of the sulfur compound to the total mass of the quinacridone pigment and the sulfur compound is preferably in the same range as the later-described range of the content ratio of the sulfur-containing pigment derivative (1) to the total mass of the quinacridone pigment and the sulfur-containing pigment derivative (1). The specific sulfur concentration is measured by the method described in Examples, for example.

The sulfur compound is the sulfur-containing pigment derivative, for example. The sulfur-containing pigment derivative has a sulfur-containing group, for example. Examples of the sulfur-containing group include a sulfo group, a sulfino group, a sulfeno group, a thiocarboxy group, dithiocarboxy group, and a sulfide group. The sulfur-containing pigment derivative is a compound in which a hydrogen atom of the above-exemplified quinacridone pigment has been substituted with a sulfur-containing group, for example.

The sulfur-containing pigment derivative is preferably a metal salt. When the sulfur-containing pigment derivative is a metal salt, affinity of the sulfur-containing pigment derivative with the aqueous medium increases. As a result, the quinacridone pigment to which the sulfur-containing pigment derivative is adsorbed favorably disperses in the aqueous medium. A preferable sulfur-containing pigment derivative being a metal salt is a sulfur compound (also referred to below as sulfur-containing pigment derivative (1)) represented by formula (1). That is, the ink preferably contains the sulfur-containing pigment derivative (1).

[Chemical formula 2]

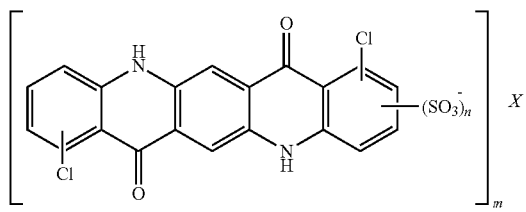

In formula (1), n represents an integer of at least 1 and no greater than 3, m represents an integer of at least 1 and no greater than 3, and X represents a metal ion.

In formula (1), n preferably represents 2 or 3. Preferably, m represents 1. X in formula (1) preferably represents a monovalent or higher and trivalent or lower metal ion, more preferably represents a divalent or trivalent metal ion, and further preferably represents $Al^{3+}$ or $Mg^{2+}$.

Examples of the sulfur-containing pigment derivative (1) includes sulfur compounds represented by formula (1-1) and formula (1-2) (also referred to below as sulfur-containing pigment derivatives (1-1) and (1-2), respectively). Note that formulas (1-1) and (1-2) indicates a case in which m in formula (1) represents 1 and m is omitted in formulas (1-1) and (1-2)

[Chemical formula 3]

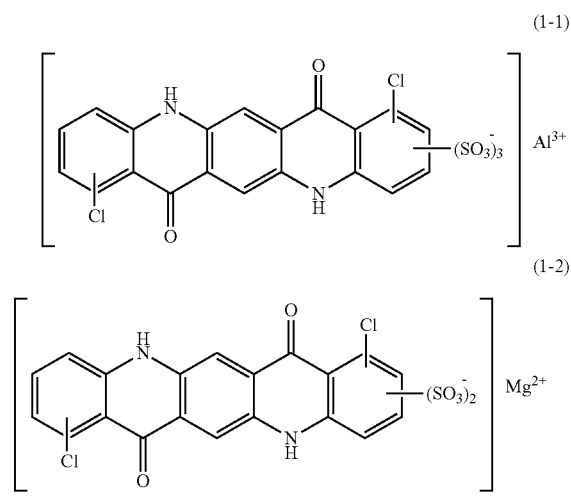

The sulfur-containing pigment derivative (1) has a percentage content to the total mass of the quinacridone pigment and the sulfur-containing pigment derivative (1) of preferably at least 5% by mass and no greater than 12% by mass. In the following, the "percentage content of the sulfur-containing pigment derivative to the total mass of the quinacridone pigment and the sulfur-containing pigment derivative" may be also referred to below as a "derivative content rate". As a result of the derivative content rate being set to at least 5% by mass and no greater than 12% by mass, adjustment of the specific sulfur concentration to a value within the desired range can be facilitated. The lower the derivative content rate is, the lower the specific sulfur concentration tends to be.

The percentage content of the sulfur-containing pigment derivative in the ink is preferably at least 0.03% by mass and no greater than 0.90% by mass, and more preferably at least 0.12% by mass and no greater than 0.40% by mass.

<Pigment Dispersion Resin>

The pigment dispersion resin includes a adsorption resin and a non-adsorption resin. The adsorption resin is adsorbed to the quinacridone pigment. The quinacridone pigment constitutes pigment particles together with the adsorption resin, for example. The pigment particles each include a core containing the quinacridone pigment and a coat layer covering the core. The coat layer is constituted by the adsorption resin. The pigment dispersion resin is hydrophilic. Therefore, the quinacridone pigment disperses in the aqueous medium in presence of the adsorption resin adsorbed to the surface of the quinacridone pigment. By contrast, the non-adsorption resin is not adsorbed to the quinacridone pigment. The non-adsorption resin is free in the aqueous medium.

As described previously, the non-adsorption resin rate is at least 20% by mass and no greater than 50% by mass. In order to further inhibit skewed ink ejection from the recording head, the non-adsorption resin rate is preferably no greater than 45% by mass, more preferably no greater than 40% by mass, and further preferably no greater than 30% by mass. In order to form images with further excellent scratch resistance, the non-adsorption resin rate is preferably at least 30% by mass, more preferably at least 40% by mass, and further preferably at least 45% by mass.

The non-adsorption resin rate can be measured by centrifugation of the ink using a centrifuge. The non-adsorption resin rate can be calculated using a calculation formula "(non-adsorption resin rate)=100×(mass of non-adsorption resin)/(total mass of pigment dispersion resin)=100×(mass of non-adsorption resin)/((mass of non-adsorption resin)+ (mass of adsorption resin)). For example, the larger the discharge amount of a wet type disperser in later-described pigment dispersion preparation is, the higher the non-adsorption resin rate tends to be.

On an UV-visible absorption spectrum of the supernatant obtained by centrifugation of the ink at 1,050,000 G for 3 hours, the absorbance of a specific peak is preferably at least 0.15 and no greater than 0.40. In the present specification, the specific peak is defined as a maximum peak in a wavelength range of at least 300 nm and no greater than 340 nm. In the following, the "absorbance of the specific peak on the UV-visible absorption spectrum of the supernatant obtained by centrifugation of the ink at 1,050,000 G for 3 hours" may be also referred to below as a "specific absorbance".

The specific peak is a peak derived from the non-adsorption resin, for example. When the specific absorbance is at least 0.15 and no greater than 0.40, the non-adsorption resin rate can be easily adjusted to a value within the desired range. As a result, occurrence of skewed ink ejection from the recording head can be inhibited and images with excellent scratch resistance can be formed with the ink. In order to form images with further excellent scratch resistance, the specific absorbance is preferably at least 0.20, and more preferably at least 0.30. In order to further inhibit skewed ink ejection from the recording head, the specific absorbance is preferably no greater than 0.30, and more preferably no greater than 0.20.

The specific absorbance can be adjusted by changing the non-adsorption resin rate, for example. The higher the non-adsorption resin rate is, the higher the specific absorbance tends to be. The specific peak appears at a wavelength of 320 nm, for example. The specific absorbance can be measured by the method described in Examples, for example.

In order to further inhibit skewed ink ejection from the recording head and increase dispersibility of the quinacridone pigment, a ratio (also referred to below as a "resin/pigment ratio") of the mass of the pigment dispersion resin to the mass of the quinacridone pigment is preferably no greater than 0.50, and more preferably at least 0.35 and no greater than 0.50. The resin/pigment ratio can be calculated using a calculation formula "(resin/pigment ratio)=(mass of pigment dispersion resin)/(mass of pigment)". The mass of the pigment dispersion resin is the total mass of the adsorption resin and the non-adsorption resin.

In order to further inhibit occurrence of skewed ink ejection from the recording head, the acid value of the pigment dispersion resin is preferably at least 60 mgKOH/g and no greater than 300 mgKOH/g, more preferably at least 80 mgKOH/g and no greater than 120 mgKOH/g, and further preferably at least 90 mgKOH/g and no greater than 110 mgKOH/g. As a result of the acid value of the pigment dispersion resin being set to at least 60 mgKOH/g, the pigment particles favorably disperse in the aqueous medium, thereby achieving formation of images with excellent color development and coloring power. As a result of the acid value of the pigment dispersion resin being set to no greater than 300 mgKOH/g by contrast, the ink can be stably stored.

In order to optimize viscosity of the ink, the pigment dispersion resin has a mass average molecular weight of preferably at least 10,000 and no greater than 50,000, and more preferably at least 15,000 and no greater than 30,000.

Examples of the pigment dispersion resin include (meth)acrylic resin, styrene-(meth)acrylic resin, styrene-maleic acid resin, and urethane resin. In terms of stably dispersing the quinacridone pigment, the pigment dispersion resin is preferably styrene-(meth)acrylic resin.

The styrene-(meth)acrylic resin includes as repeating units at least a repeating unit derived from styrene or a derivative thereof and a repeating unit derived from (meth)acrylic acid. Preferably, the styrene-(meth)acrylic resin further includes a repeating unit derived from (meth)acrylic acid ester as a repeating unit.

Examples of a first monomer that can form the repeating unit derived from styrene or a derivative thereof include styrene, α-methylstyrene, and vinyltoluene. The first monomer is preferably styrene. The percentage content of the repeating unit derived from styrene or a derivative thereof to all repeating units of the pigment dispersion resin is preferably at least 25.0% by mass and no greater than 60.0% by mass.

Examples of a second monomer that can form the repeating unit derived from (meth)acrylic acid include acrylic acid and methacrylic acid. The second monomer is preferably methacrylic acid. The percentage content of the repeating unit derived from (meth)acrylic acid in all the repeating units of the pigment dispersion resin is preferably at least 4.5% by mass and no greater than 10.0% by mass.

Examples of a third monomer that can form the repeating unit derived from (meth)acrylic acid ester includes (meth)acrylic acid alkyl ester. The (meth)acrylic acid alkyl ester is preferably a (meth)acrylic acid alkyl ester having an alkyl group with a carbon number of at least 1 and no greater than 8, more preferably a (meth)acrylic acid alkyl ester having an alkyl group with a carbon number of at least 1 and no greater than 4, further preferably methyl (meth)acrylate or butyl (meth)acrylate, and particularly preferably methyl methacrylate or butyl acrylate. Among all of the repeating units of the pigment dispersion resin, the repeating unit derived from (meth)acrylic acid ester has a percentage content of at least 35.0% by mass and no greater than 70.0% by mass, and more preferably at least 50.0% by mass and no greater than 70.0% by mass. When the pigment dispersion resin includes two or more repeating units derived from (meth)acrylic acid ester, the percentage content of the repeating unit derived from (meth)acrylic acid ester is the total percentage content of the two or more repeating units derived from (meth)acrylic acid ester.

The pigment dispersion resin is preferably a resin including at least one repeating unit derived from (meth)acrylic acid, at least one repeating unit derived from (meth)acrylic acid alkyl ester, and a repeating unit derived from styrene. Further preferably, the pigment dispersion resin is a resin including a repeating unit derived from (meth)acrylic acid, a repeating unit derived from methyl (meth)acrylate, a repeating unit derived from butyl (meth)acrylate, and a repeating unit derived from styrene. Further preferably, the pigment dispersion resin is a resin including a repeating unit derived from methacrylic acid, a repeating unit derived from methyl methacrylate, a repeating unit derived from butyl acrylate, and a repeating unit derived from styrene. The pigment dispersion resin may include only the aforementioned repeating units each as a repeating unit, or may further include a repeating unit other than these repeating units.

The pigment dispersion resin has a percentage content in the ink of preferably at least 0.5% by mass and no greater than 8.0% by mass, and more preferably at least 1.5% by mass and no greater than 4.0% by mass. As a result of the percentage content of the pigment dispersion resin being set to at least 0.5% by mass, agglomeration of the quinacridone pigment can be favorably inhibited. As a result of the percentage content of the pigment dispersion resin being set to no greater than 8.0% by mass, occurrence of nozzle clogging in the recording head can be favorably inhibited.

<Aqueous Medium>

The aqueous medium contained in the ink is a medium including water. The aqueous medium may function as a solvent or function as a dispersion medium. Specific examples of the aqueous medium include an aqueous medium containing a water-soluble organic solvent and water.

Examples of the water-soluble organic solvent include glycol compounds, triol compounds, glycol ether compounds, lactam compounds, nitrogen-containing compounds, acetate compounds, γ-butyrolactone, thiodiglycol, and dimethyl sulfoxide.

Examples of the glycol compounds include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. A preferable glycol compound is 3-methyl-1,5-pentanediol.

Examples of the triol compounds include glycerin, 1,2,3-butanetriol, and 1,2,6-hexanetriol. A preferably triol compound is glycerin.

Examples of the glycol ether compounds include alkylene glycol alkyl ethers. More specific examples include diethylene glycol diethyl ether, diethylene glycol monoethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, and propylene glycol monomethyl ether. A preferable glycol ether compound is triethylene glycol monobutyl ether.

Examples of the lactam compounds include 2-pyrrolidone and N-methyl-2-pyrrolidone. A preferably lactam compound is 2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

The aqueous medium is preferably a solvent mixture of water, triethylene glycol monobutyl ether, 3-methyl-1,5-pentanediol, and glycerin.

The aqueous medium has a percentage content in the ink of preferably at least 30% by mass and no greater than 95% by mass, and more preferably at least 70% by mass and no greater than 95% by mass. The glycol ether compound has a percentage content in the ink of preferably at least 1% by mass and no greater than 10% by mass, and more preferably at least 3% by mass and no greater than 5% by mass. The glycol ether compound has a percentage content in the aqueous medium of preferably at least 1% by mass and no greater than 10% by mass, and more preferably at least 3% by mass and no greater than 5% by mass. The glycol ether compound has a percentage content in the water-soluble organic solvent of at least 1% by mass and no greater than 5% by mass, and more preferably at least 1% by mass and no greater than 3% by mass.

<Surfactant>

The surfactant optimizes compatibility and dispersion stability of each component of the ink. Furthermore, the surfactant optimizes permeability of the ink to the recording medium. The surfactant is preferably a nonionic surfactant.

Examples of the nonionic surfactant include acetylenediols and ethylene oxide adducts of acetylenediols. Examples of the acetylenediols include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. The nonionic surfactant is preferably an ethylene oxide adduct of an acetylenediol or an ethylene oxide adduct of an acetylene glycol. The nonionic surfactant has an HLB value of preferably at least 4 and no greater than 14, and more preferably at least 4 and no greater than 8 or at least 10 and no greater than 14. When the ink contains a surfactant, the percentage content of the surfactant in the ink is preferably at least 0.01% by mass and no greater than 1.0% by mass.

<Additional Component>

The ink may contain a known additive (specific examples include a solution stabilizer, an anti-drying agent, an antioxidant, a viscosity modifier, a pH adjuster, a neutralizer, and an antifungal agent) as necessary. Note that no known additive may be contained in the ink.

(Preferable Composition)

The ink preferably has any of compositions 1 to 5 shown below in Table 1 or any of compositions 6 to 9 shown below in Table 2. Note that "Pigment" in Tables 1 and 2 indicates a quinacridone pigment. "PR122" indicates C.I. Pigment Red 122. "PV19" indicates C.I. Pigment Violet 19. "Derivative" indicates a sulfur-containing pigment derivative. The type "1-1" of the derivative indicates the aforementioned sulfur-containing pigment derivative (1-1) (i.e., the sulfur-containing pigment derivative (1-1) used in Examples) represented by formula (1-1). The type "R1" in "Pigment dispersion resin" indicates the pigment dispersion resin (R1) used in Examples. "TGME" indicates triethylene glycol monobutyl ether. "MPD" indicates 3-methyl-1,5-pentanediol. "GL" indicates glycerin. Also, "Rate" below in Tables 1 and 2 indicates a preferable numerical range of a corresponding percentage content (% by mass). For example, "5.1-6.3" being a rate of the composition 1 indicates containment of at least 5.1% by mass and no greater than 6.3% by mass of the pigment (quinacridone pigment). "Sulfur concentration" indicates the specific sulfur concentration. "Phosphorous concentration" indicates the specific phosphorous concentration.

TABLE 1

| Composition | | 1 | 2 | 3 | 4 | 5 |
|---|---|---|---|---|---|---|
| Pigment | Type | PR122 | PR122 | PR122 | PR122 | PR122 |
| | Rate (% by mass) | 5.1-6.3 | 5.1-6.3 | 5.1-6.3 | 5.1-6.3 | 5.1-6.3 |
| Derivative | Type | 1-1 | 1-1 | 1-1 | 1-1 | 1-1 |
| | Rate (% by mass) | 0.2-0.4 | 0.2-0.4 | 0.2-0.4 | 0.2-0.4 | 0.2-0.4 |
| Pigment | Type | R1 | R1 | R1 | R1 | R1 |
| dispersion resin | Rate (% by mass) | 2.2-2.6 | 2.2-2.6 | 2.2-2.6 | 2.2-2.6 | 2.2-2.6 |
| Surfactant | Rate (% by mass) | 0.4-0.6 | 0.4-0.6 | 0.4-0.6 | 0.4-0.6 | 0.4-0.6 |
| TGME | Rate (% by mass) | 3.6-4.4 | 3.6-4.4 | 3.6-4.4 | 3.6-4.4 | 3.6-4.4 |
| MPD | Rate (% by mass) | 18.5-22.5 | 18.5-22.5 | 18.5-22.5 | 18.5-22.5 | 18.5-22.5 |
| GL | Rate (% by mass) | 4.5-5.5 | 4.5-5.5 | 4.5-5.5 | 4.5-5.5 | 4.5-5.5 |
| Water | Rate (% by mass) | Rest | Rest | Rest | Rest | Rest |
| Sulfur concentration (ppm) | | 1.2-1.4 | 1.2-1.4 | 1.2-1.4 | 1.2-1.4 | 1.2-1.4 |
| Non-adsorption resin rate (% by mass) | | 27-33 | 45-50 | 20-22 | 45-50 | 45-50 |
| Phosphorous concentration (ppm) | | 5.4-6.6 | 1.8-2.2 | 5.4-6.0 | 1.0-1.1 | 5.4-6.0 |

TABLE 2

| Composition | | 6 | 7 | 8 | 9 |
|---|---|---|---|---|---|
| Pigment | Type | PR122 | PR122 | PV19 | PR122 |
| | Rate (% by mass) | 5.0-6.0 | 4.8-5.8 | 5.1-6.3 | 5.1-6.3 |
| Derivative | Type | 1-1 | 1-1 | 1-1 | 1-2 |
| | Rate (% by mass) | 0.4-0.6 | 0.6-0.8 | 0.2-0.4 | 0.2-0.4 |

TABLE 2-continued

| Composition | | 6 | 7 | 8 | 9 |
|---|---|---|---|---|---|
| Pigment | Type | R1 | R1 | R1 | R1 |
| dispersion resin | Rate (% by mass) | 2.2-2.6 | 2.2-2.6 | 2.2-2.6 | 2.2-2.6 |
| Surfactant | Rate (% by mass) | 0.4-0.6 | 0.4-0.6 | 0.4-0.6 | 0.4-0.6 |
| TGME | Rate (% by mass) | 3.6-4.4 | 3.6-4.4 | 3.6-4.4 | 3.6-4.4 |
| MPD | Rate (% by mass) | 18.5-22.5 | 18.5-22.5 | 18.5-22.5 | 18.5-22.5 |
| GL | Rate (% by mass) | 4.5-5.5 | 4.5-5.5 | 4.5-5.5 | 4.5-5.5 |
| Water | Rate (% by mass) | Rest | Rest | Rest | Rest |
| Sulfur concentration (ppm) | | 1.8-2.2 | 5.4-6.0 | 1.2-1.4 | 1.2-1.4 |
| Non-adsorption resin rate (% by mass) | | 27-33 | 27-33 | 27-33 | 27-33 |
| Phosphorous concentration (ppm) | | 1.8-2.2 | 1.8-2.2 | 5.4-6.0 | 5.4-6.0 |

<Quinacridone Pigment Synthesis Method>

Although the outline of a quinacridone pigment synthesis method has been described previously, one example of the quinacridone pigment synthesis methods is described further in detail below.

Examples of the monovalent group represented by $R^1$ or $R^2$ in formulas (10) and (20) include a hydrogen atom, an alkyl group, and a halogen atom. The halogen atom represented by $R^1$ or $R^2$ is preferably a chlorine atom. The alkyl group represented by $R^1$ or $R^2$ is preferably an alkyl group with a carbon number of at least 1 and no greater than 6, and more preferably a methyl group.

In reaction (r-1), the compound (20) is obtained by reacting the compound (10) in presence of a catalyst. The catalyst reaction (r-1) is a dehydration ring closure reaction. For example, in reaction (r-1), the compound (10) is heated under pressure at a first specific temperature for a specific time in presence of a catalyst (e.g., a phosphorous-containing catalyst, and more specific examples include the polyphosphoric acids). The first specific temperature is at least 85° C. and no greater than 200° C., for example. The specific time is at least 1 hour and no greater than 3 hours, for example. In reaction (r-1), an organic solvent such as acetone may be further used in addition to the compound (10) and the catalyst. Alternatively or additionally, an alkaline salt as a result of saponification of the compound (10) may be used in reaction (r-1) in place of the compound (10).

Reaction (r-1) followed by an alkaline treatment of the compound (20), if necessary, can yield a β-type quinacridone pigment. The alkaline treatment can be carried out for example by heating alkali and a wet cake of the compound (20) at a second specific temperature using an autoclave. The second specific temperature is at least 120° C. and no greater than 200° C., for example. An organic solvent may be used in addition in the alkaline treatment. Examples of an organic solvent that can be used in the alkaline treatment include N,N-dimethylformamide and glycol.

The quinacridone pigment synthesis method through reaction (r-1) does not need to desorb a sulfonic acid group or a sulfonic acid chloride group remaining in the produced quinacridone pigment using a sulfuric acid as compared to a synthesis method using an acid having a sulfonic acid group as a ring closing agent. As such, the quinacridone pigment synthesis method through reaction (r-1) can be easily reduced to practice.

The quinacridone pigment may be pulverized as necessary. The quinacridone pigment subjected to reaction (r-1) may be subjected to the following solvent treatment and post-treatment, for example.

<Pigment Composition Preparation Method>

The following describes one example of pigment composition preparation methods. The pigment composition preparation method includes a solvent treatment (also referred to below as a process A) and a post-treatment (also referred to below as a process B). The sulfur-containing pigment derivative is added in the process B. As necessary, the sulfur-containing pigment derivative may be added in the process A in addition to in the process B.

(Process A in Pigment Composition Preparation Method)

In the process A, the quinacridone pigment is treated with a solvent. An example of the quinacridone pigment treatment is a method in which the quinacridone pigment and a solvent is melt-kneaded using a kneader (e.g., a salt milling kneader). In the process A, crystal growth of the quinacridone pigment and micronization of the quinacridone pigment are promoted. Promotion of micronization of the quinacridone pigment optimizes colorability and chroma of the quinacridone pigment. The temperature and time of the quinacridone pigment treatment are not limited particularly and are appropriately set to achieve the desired particle diameter and particle size distribution of the quinacridone pigment. In the process A, the sulfur-containing pigment derivative may be added as necessary. Furthermore, an inorganic base (more specific examples include sodium hydroxide and potassium hydroxide) may be added as necessary as a grinding aid. The melt-kneaded product of the quinacridone pigment as a result of the process A is washed with water or a solvent as necessary to be collected as a wet cake, for example.

(Process B in Pigment Composition Preparation Method)

In the process B, the melt-kneaded product of the quinacridone pigment as a result of the process A is post-treated. An example of the post-treatment is a method of removing the solvent from the melt-kneaded product of the quinacridone pigment to separate the pigment composition from the melt-kneaded product. Examples of methods for separating the pigment composition include filtration, drying, and solvent distillation using a rotary evaporator. In solvent distillation, the temperature for solvent distillation is a temperature of at least the boiling point of the solvent, for example. The separated pigment composition may be pulverized as necessary.

In the process B, the sulfur-containing pigment derivative is added. Through the process B, agglomeration of the quinacridone pigment is inhibited and both dispersibility and preservation stability of the quinacridone pigment can be achieved. The sulfur-containing pigment derivative may be added at a time separation of the pigment compositions from the melt-kneaded product starts or may be added during separation. The mass of the sulfur-containing pigment derivative added in the process B (the total mass of the sulfur-containing pigment derivative added in the process A and that added in the process B when the sulfur-containing pigment derivative is added in the process A in addition to in the process B) is preferably at least 0.5 parts by mass and no greater than 15 parts by mass to 100 parts by mass of the quinacridone pigment, more preferably at least 1 part by mass and no greater than 10 parts by mas, further preferably at least 3 parts by mass and no greater than 6 parts by mass, and further more preferably at least 3 parts by mass and no greater than 5 parts by mass. As a result of the mass of the sulfur-containing pigment derivative being set to at least 0.5 parts by mass and no greater than 15 parts by mass to 100 parts by mass of the quinacridone pigment, hue of the quinacridone pigment is optimized. As a result of the mass of the sulfur-containing pigment derivative being at least 3 parts by mass and no greater than 6 parts by mass to 100 parts by mass of the quinacridone pigment, the specific sulfur concentration can be easily adjusted to a value within the desired range.

When the sulfur-containing pigment derivative is added in the process A in addition to in the process B, the type of the sulfur-containing pigment derivative added in the process B may be the same as or different from the type of the sulfur-containing pigment derivative added in the process A. Also, when the sulfur-containing pigment derivative is added in the process A in addition to in the process B, the mass of the sulfur-containing pigment derivative added in the process B is preferably equal to or larger than the mass of the sulfur-containing pigment derivative added in the process A in terms of optimizing colorability of the quinacridone pigment.

<Ink Production Method>

An example of methods for producing the ink of the first embodiment is described below. The production method of the ink of the first embodiment includes a pigment dispersion preparation process, an ultrafiltration process, and a mixing process.

(Pigment Dispersion Preparation Process)

In the pigment dispersion preparation process, a pigment dispersion resin, the aqueous medium, and the pigment composition including the quinacridone pigment are mixed to obtain a pigment dispersion. The pigment dispersion may further contain a surfactant in order to sufficiently disperse the pigment particles. In the pigment dispersion, the pigment particles constituted by the quinacridone pigment and the pigment dispersion resin have a $D_{50}$ of at least 70 nm and less than 140 nm, and more preferably at least 110 nm and no greater than 130 nm.

The quinacridone pigment has a percentage content in the pigment dispersion of preferably at least 5% by mass and no greater than 25% by mass, and more preferably at least 10% by mass and no greater than 20% by mass. The pigment dispersion resin has a percentage content in the pigment dispersion of preferably at least 2% by mass and no greater than 10% by mass, and more preferably at least 4% by mass and no greater than 8% by mass. When the pigment dispersion contains a surfactant, the surfactant has a percentage content in the pigment dispersion of preferably at least 0.1% by mass and no greater than 2% by mass, and more preferably at least 0.3% by mass and no greater than 1% by mass.

The pigment dispersion can be prepared by wet dispersion of the components contained in the pigment dispersion using a media type wet disperser. Examples of the media type wet disperser include bead mills (specific examples include "NANO GRAIN MILL" produced by Asada Iron Works Co., Ltd., "MSC MILL" produced by Nippon Coke & Engineering Co., Ltd., and "DYNO (registered Japanese trademark) MILL" produced by Willy A. Bachofen AG).

Wet dispersion using a media type wet disperser uses small-diameter beads (e.g., beads with a diameter of at least 0.5 mm and no greater than 1.0 mm) as a medium. Change in diameter of the beads can change the non-adsorption resin rate and the degree of dispersion of the pigment. The smaller the diameter of the beads is, the smaller the $D_{50}$ of the pigment particles tends to be. As the diameter of the beads is decreased, the cores containing the quinacridone pigment are easily covered by the pigment dispersion resin and the non-adsorption resin rate tends to decrease. The material of the beads is not limited particularly and a hard material (e.g., glass or zirconia) is preferable. The discharge amount of the media type wet disperser is at least 200 g/min and no greater than 600 g/min, for example. The larger the discharge amount of the media type wet disperser is, the higher the non-adsorption resin rate tends to be.

(Ultrafiltration Process)

In the ultrafiltration process, the pigment dispersion is ultrafiltered. Ultrafiltration removes at least a portion of the phosphorous-containing catalyst to decrease the phosphorous concentration of the pigment dispersion. When the ink contains the pigment dispersion as described above, the specific phosphorous concentration of the ink can be easily adjusted to a value within the desired range. In order to remove at least a portion of the phosphorous-containing catalyst, the molecular weight cutoff of the ultrafiltration membrane used in ultrafiltration is preferably selected to be a molecular weight cutoff at which at least a portion of the phosphorous-containing catalyst is filtered while the components of the pigment dispersion other than that are not filtered out. Also, the molecular weight cutoff of the ultrafiltration membrane used in ultrafiltration is preferably at least the molecular weight of the phosphorous-containing catalyst and no greater than the molecular weight of the pigment dispersion resin. In order to adjust the specific phosphorous concentration to a value within the desired range, the circulation time in ultrafiltration is preferably at least 0.4 hours. In order to reduce manufacturing cost, the circulation time in ultrafiltration is preferably no greater than 2.0 hours. Through ultrafiltration, a liquid containing the phosphorous-containing catalyst is discharged as filtrate and a liquid containing the components of the pigment dispersion other than the phosphorous-containing catalyst is re-circulated as recovered liquid. The solid concentration of the pigment dispersion can be kept constant by adding an equal amount of water to the amount of the discharged filtrate to the recovered liquid.

(Mixing Process)

In the mixing process, the pigment dispersion after the ultrafiltration process and a component (e.g., further added aqueous medium and surfactant) added according to necessity are mixed using a stirrer. After each component of the ink is mixed, foreign matter and coarse particles may be removed using a filter (e.g., a filter with a pore size of no greater than 5 µm).

The pigment dispersion has a percentage content in all the raw materials of the ink of at least 25% by mass and no greater than 60% by mass, for example. Note that the ink of the first embodiment can be suitably used in a later-described inkjet recording apparatus, for example.

Second Embodiment: Inkjet Recording Apparatus

An inkjet recording apparatus according to a second embodiment of the present disclosure is described next. The inkjet recording apparatus of the second embodiment includes recording heads and a conveyance section that conveys a recording medium. One of the recording heads ejects the ink of the first embodiment toward the recording medium. As such, with the inkjet recording apparatus of the second embodiment: occurrence of skewed ink ejection from a recording head can be inhibited; images with excellent scratch resistance can be formed; the ink can be excellent in re-solubility; and the quinacridone pigment can be excellent in dispersibility therein, for the same reasons as described in the first embodiment.

An inkjet recording apparatus 1 as one example of the inkjet recording apparatus of the second embodiment is described below with reference to the accompanying drawings. Note that the drawings schematically illustrate elements of configuration in order to facilitate understanding, and properties such as the size and number of each element of configuration illustrated in the drawings may differ from actual properties. The X axis, the Y axis, and the Z axis illustrated in FIGS. 1 to 4 are perpendicular to one another.

The inkjet recording apparatus 1 illustrated in FIG. 1 includes a sheet feed section 3, a first recording head 4C, a second recording head 4M, a third recording head 4Y, a fourth recording head 4K, a liquid accommodation section 5, a first conveyance section 6, a second conveyance section 7, an ejection section 8, and a maintenance section 9. In the following, the first recording head 4C to the fourth recording head 4K are simply referred to as "recording heads 4" where there is no need to distinguish therebetween.

The sheet feed section 3 includes a plurality of sheet feed cassettes 31, a plurality of pickup rollers 32, a plurality of conveyance rollers 33, and a registration roller pair 34. Sheets S of a recording medium are stacked and accommodated in the sheet feed cassettes 31. The pickup rollers 32 each pick up the sheets S accommodated in the sheet feed cassettes 31 one at a time. The conveyance rollers 33 convey the sheet S picked up by one of the pickup rollers 32. The registration roller pair 34 temporarily stops the sheet S conveyed by the conveyance rollers 33 and then supplies the sheet S to the first conveyance section 6 with a specific timing.

The recording heads 4 are arranged above the first conveyance section 6. The first recording head 4C to the fourth recording head 4K are arranged in parallel to a conveyance direction D of the sheet S in the stated order. The first recording head 4C to the fourth recording head 4K are arranged at the same height. The first recording head 4C to the fourth recording head 4K are loaded with inks of four different colors (e.g., cyan, magenta, yellow, and black). The ink loaded in the second recording head 4M is the ink of the first embodiment in magenta. The recording heads 4 eject the respective inks toward the sheet S. Of the recording heads 4, the second recording head 4M ejects the ink of the first embodiment being a magenta ink. As a result, an image (e.g., a color image) is formed on the sheet S being conveyed by the first conveyor belt 63.

The liquid accommodation section 5 includes a first ink tank 51C, a second ink tank 51M, a third ink tank 51Y, a fourth ink tank 51K, and a cleaning solution tank 52. In the following, the first ink tank 51C to the fourth ink tank 51K are referred to simply as "ink tanks 51" where there is no need to distinguish therebetween. The first ink tank 51C to the fourth ink tank 51K accommodate respective inks of four different colors (e.g., cyan, magenta, yellow, and black). The ink accommodated in the second ink tank 51M is the ink of the first embodiment being a magenta ink. The first ink tank 51C to the fourth ink tank 51K supply the inks to the first recording head 4C to the fourth recording head 4K, respectively. The cleaning solution tank 52 supplies a cleaning solution to a liquid-impregnated member 91.

The first conveyance section 6 is disposed downstream of the sheet feed section 3 in terms of the conveyance direction D of the sheet S. The first conveyance section 6 includes a first driven roller 61, a first drive roller 62, and a first conveyor belt 63. The first drive roller 62 is disposed downstream of the first driven roller 61 in terms of the conveyance direction of the sheet S. The first conveyor belt 63 is an endless belt wound between the first driven roller 61 and the first drive roller 62. The first drive roller 62 is rotationally driven in the anticlockwise direction in FIG. 1. This causes the first drive roller 62 to circulate the first conveyor belt 63. Circulation of the first conveyor belt 63 conveys the sheet S fed from the sheet feed section 3 in the conveyance direction D to the second conveyance section 7. In the manner described above, the first conveyance section 6 conveys the sheet S. With the first conveyor belt 63 therebetween, the first driven roller 61 follows the rotation of the first drive roller 62.

The second conveyance section 7 is disposed downstream of the first conveyance section 6 in terms of the conveyance direction D of the sheet S. The second conveyance section 7 includes a second driven roller 71, a second drive roller 72, and a second conveyor belt 73. The second drive roller 72 is disposed downstream of the second driven roller 71 in terms of the conveyance direction D of the sheet S. The second conveyor belt 73 is an endless belt wound between the second driven roller 71 and the second drive roller 72. The second drive roller 72 is rotationally driven in the anticlockwise direction in FIG. 1. This causes the second drive roller 72 to circulate the second conveyor belt 73. Circulation of the second conveyor belt 73 conveys the sheet S conveyed in the conveyance direction D from the first conveyance section 6 to the ejection section 8. In the manner described above, the second conveyance section 7 conveys the sheet S. With the second conveyor belt 73 therebetween, the second driven roller 71 follows the rotation of the second drive roller 72.

The ejection section 8 is disposed downstream of the second conveyance section 7 in terms of the conveyance direction D of the sheet S. The ejection section 8 includes an exit tray 81, an ejection drive roller 82, and an ejection driven roller 83. The ejection drive roller 82 and the ejection driven roller 83 are in pressure contact with each other at a location opposite to each other. The ejection drive roller 82 is rotationally driven in the anticlockwise direction in FIG. 1. The ejection driven roller 83 follows the rotation of the ejection drive roller 82. This causes the ejection drive roller 82 and the ejection driven roller 83 to eject the sheet S conveyed from the second conveyance section 7 onto the exit tray 81. The ejected sheet S are placed on the exit tray 81.

The maintenance section 9 includes a liquid-impregnated member 91 and a cleaning member 92. The liquid-impregnated member 91 is impregnated with the cleaning solution. The liquid-impregnated member 91 comes in contact with the ejection surfaces (see FIG. 2) of the recording heads 4 to supply the cleaning solution to the ejection surfaces 42. The liquid-impregnated member 91 is sponge, non-woven cloth, or a water-absorbent sheet, for example. The cleaning member 92 wipes the ejection surfaces 42 of the recording heads 4. In the manner described above, ink attached to the ejection surfaces 42 is cleaned. The cleaning member 92 is a rubber-made wiper, for example.

Figure 2:
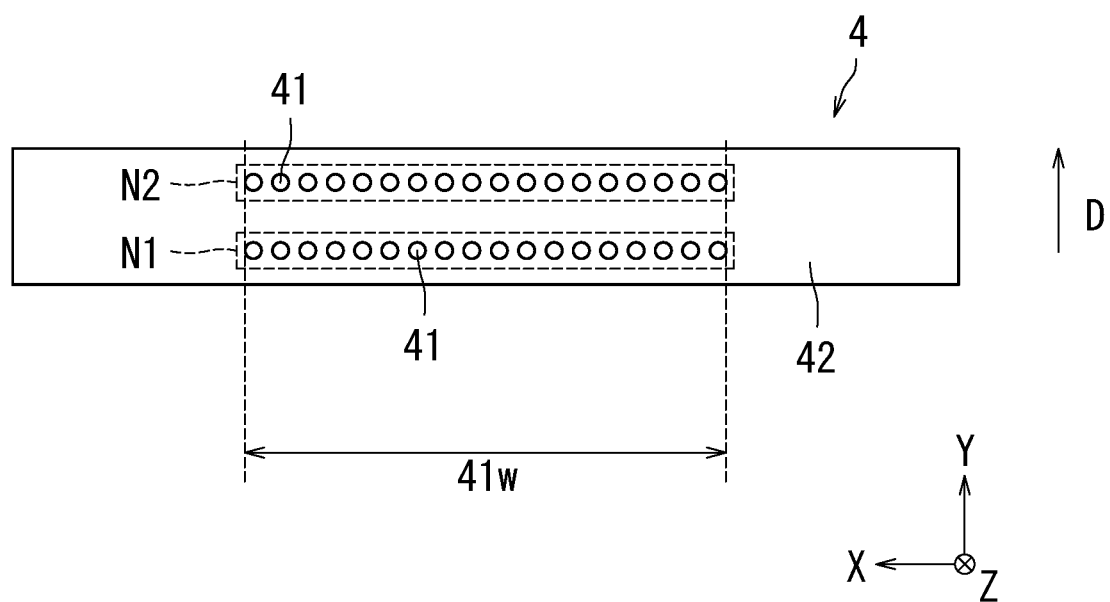
FIG. 2 illustrates the lower surface of a recording head illustrated in FIG. 1.

The recording heads 4 are further described next with reference to FIG. 2. FIG. 2 illustrates the lower surface of a recording head 4 illustrated in FIG. 1.

As illustrated in FIG. 2, the recording head 4 includes a first nozzle row N1, a second nozzle row N2, and an ejection surface 42. For facilitating understanding, the first nozzle row N1 and the second nozzle row N2 are encircled by broken lines in FIG. 2. Each of the first nozzle row N1 and the second nozzle row N2 includes a plurality of nozzles 41. The nozzles 41 eject an ink toward the sheet S. The nozzles 41 are open at the ejection surface 42. The first nozzle row N1 and the second nozzle row N2 are arranged in parallel to the conveyance direction D of the sheet S. The nozzles 41 are spaced at intervals in a direction perpendicular to the conveyance direction D of the sheet S in each of the first nozzle row N1 and the second nozzle row N2. The recording head 4 is a line head, for example.

The first nozzle row N1 and the second nozzle row N2 each have a width 41w (i.e., a width of an area in which the recording head 4 is recordable) that is equal to or wider than the width of the sheet S. As such, the recording head 4 in a fixed state can record an image on the sheet S being conveyed on the first conveyor belt 63. That is, the inkjet recording apparatus 1 employs a single path method in which shuttle movement is not performed. The inkjet recording apparatus 1 of the second embodiment, which includes the recording heads 4 as described above, can perform high-speed printing compared to an inkjet recording apparatus including serial heads.

Figure 3:
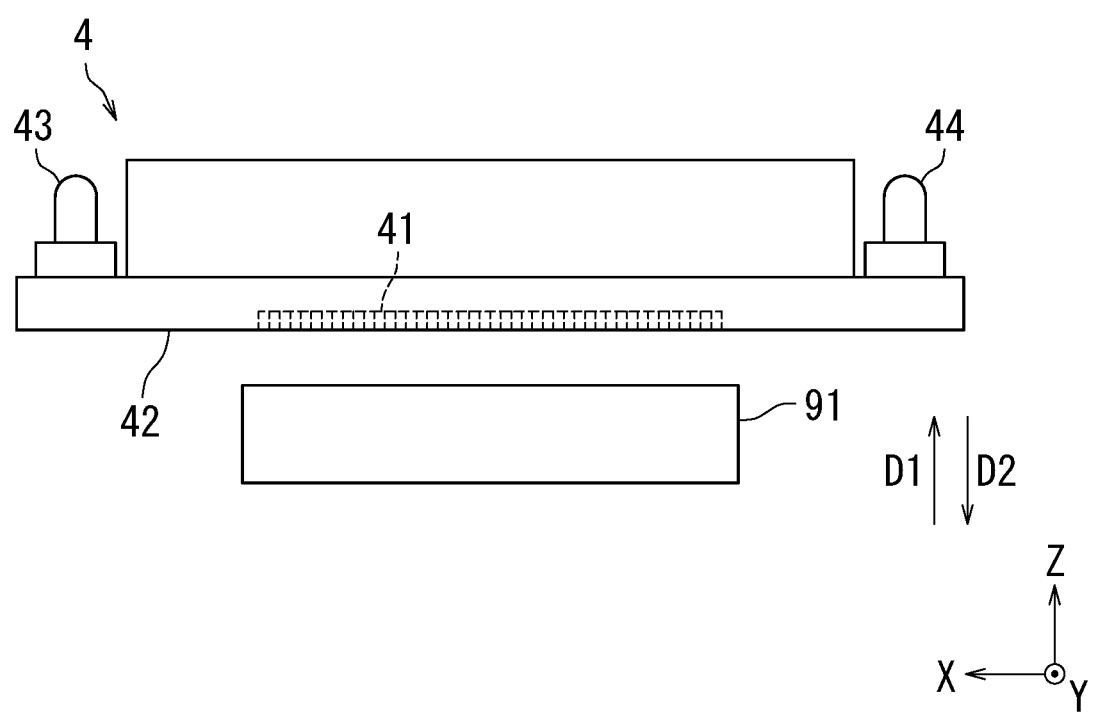
FIG. 3 is a diagram explaining a cleaning solution supply operation.
Figure 4:
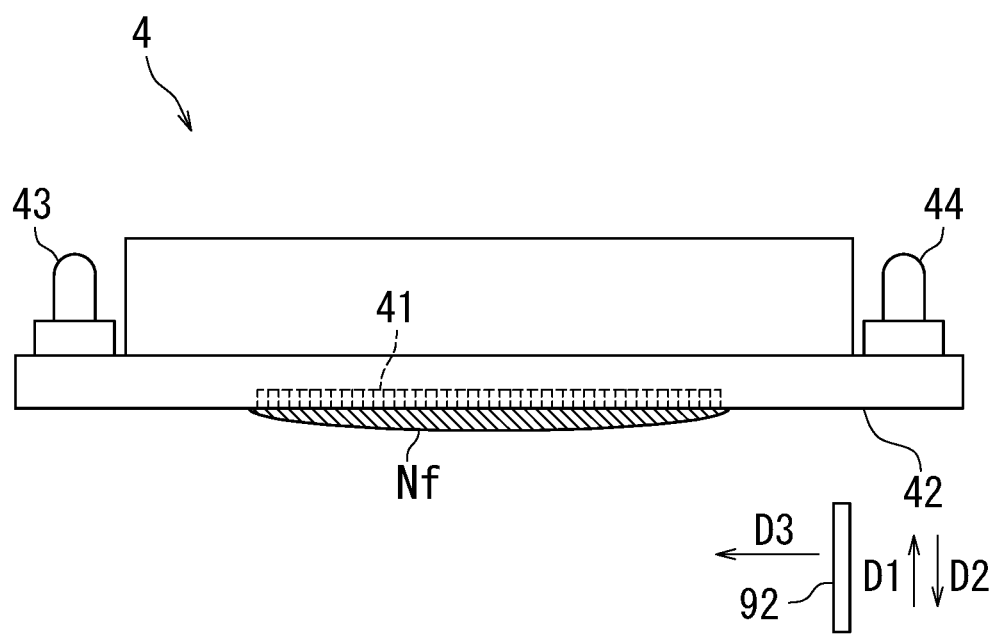
FIG. 4 is a diagram explaining a purging operation and a wiping operation.

With reference to FIGS. 3 and 4, a cleaning operation by the maintenance section 9 is described next. The cleaning operation includes a cleaning solution supply operation, a purging operation, and a wiping operation. FIG. 3 is a diagram explaining the cleaning solution supply operation. FIG. 4 is a diagram explaining the purging operation and the wiping operation. Note that although the nozzles 41 are not recognized when viewed from a side of the recording head 4, the position of the nozzles is indicated by broken lines in FIGS. 3 and 4 for facilitating understanding.

As illustrated in FIG. 3, the recording head 4 includes an ink inlet 43 and an ink outlet 44. The ink flows into the recording head 4 from the ink tank 51 through the ink inlet 43 and flows out of the recording head 4 through the ink outlet 44.

As illustrated in FIG. 1, the liquid-impregnated member 91 of the maintenance section 9 is disposed below the second conveyance section 7. The cleaning member 92 of the maintenance section 9 is disposed below the liquid-impregnated member 91. The liquid-impregnated member 91 and the cleaning member 92 are each movable between the position opposite to the second conveyance section 7 and the position opposite to the ejection surface 42 of each recording head 4. Furthermore, the liquid-impregnated member 91 is movable in both an ascending direction D1 and a descending direction D2 as illustrated in FIG. 3. The cleaning member 92 is movable in any of the ascending direction D1, the descending direction D2, and a wiping direction D3 as illustrated in FIG. 4. The "ascending direction D1" is a direction approaching the ejection surface 42 in the Z-axis direction. The "descending direction D2" is a direction away from the ejection surface 42 in the Z-axis direction. The "wiping direction D3" is a direction along the ejection surface 42. The liquid-impregnated member 91 and the cleaning member 92 are moved by a known drive mechanism (not illustrated).

Here, ink attached to the ejection surface 42 may dry and adhere thereto. In order to clean the adhering ink as described above, the cleaning operation is performed.

The cleaning solution supply operation of the cleaning operation is described first. The liquid-impregnated member 91 is impregnated with the cleaning solution. As illustrated in FIG. 3, the liquid-impregnated member 91 moves to the position opposite to ejection surface 42, and then move in the ascending direction D1. Thereafter, the liquid-impregnated member 91 is pressed against the ejection surface 42. In the manner described above, the cleaning solution impregnated in the liquid-impregnated member 91 is attached to the ejection surface 42. It is preferable to maintain the state in which the liquid-impregnated member 91 is pressed against the ejection surface 42 for a specific time. The specific time is preferably at least 1 second and no greater than 5 minutes. Once the specific time elapses, the liquid-impregnated member 91 moves in the descending direction D2. This releases the state in which the liquid-impregnated member 91 is pressed against the ejection surface 42.

The purging operation is described next. As illustrated in FIG. 4, the inks are purged from the recording head 4. In FIG. 4, the purged ink is marked with a reference sign "Nf". Specifically, pressure application by the recording head 4 forcedly discharges the ink from the nozzles 41. This eliminates clogging and the like of the nozzles 41 while the purged ink Nf attaches to the ejection surface 42 of the recording head 4.

The wiping operation is described next. The cleaning member 92 moves to the position opposite to the ejection surface 42 (position illustrated in FIG. 4), and then moves in the ascending direction D1. Thereafter, the cleaning member 92 is pressed against the ejection surface 42. The cleaning member 92 moves in the direction (the wiping direction D3 in FIG. 4) along the ejection surface 42 while the state in which the cleaning member 92 is pressed against the ejection surface 42 is maintained. In the manner described above, the cleaning member 92 wipes the ejection surface 42. As a result, the cleaning solution and ink (e.g., the adhering ink and the purged ink Nf) attached to the ejection surface 42 are removed. Through the above, the ejection surface 42 of the recording head 4 is cleaned. Next, the cleaning member 92 moves in the descending direction D2. This releases the state in which the cleaning member 92 is pressed against the ejection surface 42.

The inkjet recording apparatus 1 which is an example of the inkjet recording apparatus of the second embodiment has been described so far. However, the inkjet recording apparatus of the second embodiment is not limited to the inkjet recording apparatus 1. The inkjet recording apparatus of the second embodiment may employ a multipath method. Furthermore, the number of the nozzles 41, the intervals between the nozzles 41, and the positional relationship between the nozzles 41 in the first recording head 4C to the fourth recording head 4K can be set as appropriate according to the specification of the apparatus. The cleaning solution supply operation may be ejection of the cleaning solution by inkjetting, application of the cleaning solution using a roller, or spraying of the cleaning solution. The cleaning solution supply operation, the purging operation, and the wiping operation may each be repeated. The order of the cleaning solution supply operation and the purging operation is not limited. The cleaning member 92 may perform reciprocal motion along the ejection surface 42. For example, it is possible that in a state in which the cleaning member 92 is pressed against the ejection surface 42, the cleaning member 92 moves in a first direction (the wiping direction D3 in FIG. 4) along the ejection surface 42 and then moves in a second direction (direction opposite to the wiping direction D3 in FIG. 4) opposite to the first direction along the ejection surfaces 42.

EXAMPLES

The following described examples of the present disclosure. However, the present disclosure is not limited to the following examples. Note that ion exchange water is referred to simply as water in the following examples.

Preparation of Pigment Dispersion Resin (R1)

First, a pigment dispersion resin (R1) used for ink preparation was prepared. The pigment dispersion resin (R1) included a repeating unit (MAA unit) derived from methacrylic acid, a repeating unit (MMA unit) derived from methyl methacrylate, a repeating unit (BA unit) derived from butyl acrylate, and a repeating unit (ST unit) derived from styrene. The pigment dispersion resin (R1) had a mass average molecular weight (Mw) of 20,000 and an acid value of 100 mgKOH/g. The percentage contents of the MAA unit, the MMA unit, the BA unit, and the ST unit to the mass of all repeating units included in the pigment dispersion resin (R1) were respectively 8.1% by mass, 36.9% by mass, 30.0% by mass, and 25.0% by mass.

A-5000, A-2500, and A-1000 each being a TSKgel standard polystyrene produced by Tosoh Corporation, a calibration curve was plotted.

The conditions for the mass average molecular weight measurement were as follows.

Column: "TSKgel SuperMultiporeHZ-IT produced by Tosoh Corporation H" (semi-micron column with 4.6 mm I.D.×15 cm)
Number of columns: 3
Eluent: tetrahydrofuran
Flow rate: 0.35 mL/min
Sample injection amount: 10 μL
Measurement temperature: 40° C.
Detector: refractive index (RI) detector Ink Preparation Inks (A-1) to (A-9) of Examples and inks (B-1) to (B-6) of Comparative Examples were prepared according to the following methods. Tables 3 and 4 show the preparation conditions, the specific sulfur concentrations, the non-adsorption resin rates, and the specific phosphorous concentrations of these inks.

TABLE 3

|  |  |  | E1 | E2 | E3 | E4 | E5 | E6 | E7 | E8 | E9 |
|---|---|---|---|---|---|---|---|---|---|---|---|
| Ink |  |  | A-1 | A-2 | A-3 | A-4 | A-5 | A-6 | A-7 | A-8 | A-9 |
| Pigment composition | Pigment | Type | PR122 | PR122 | PR122 | PR122 | PR122 | PR122 | PR122 | PV19 | PR122 |
|  |  | Percentage content (wt %) | 95 | 95 | 95 | 95 | 95 | 92 | 88 | 95 | 95 |
|  | Derivative | Type | 1-1 | 1-1 | 1-1 | 1-1 | 1-1 | 1-1 | 1-1 | 1-1 | 1-2 |
|  |  | Percentage content (wt %) | 5 | 5 | 5 | 5 | 5 | 8 | 12 | 5 | 5 |
| Sulfur concentration (ppm) |  |  | 1.3 | 1.3 | 1.3 | 1.3 | 1.3 | 2.0 | 6.0 | 1.3 | 1.3 |
| Dispersion | Discharge amount (g/min) |  | 350 | 700 | 300 | 700 | 700 | 350 | 350 | 350 | 350 |
| Non-adsorption resin rate (wt %) |  |  | 30 | 50 | 20 | 50 | 50 | 30 | 30 | 30 | 30 |
| Ultrafiltration | Circulation time (min) |  | 30 | 60 | 30 | 90 | 30 | 60 | 60 | 30 | 30 |
| Phosphorous concentration (ppm) |  |  | 6.0 | 2.0 | 6.0 | 1.0 | 6.0 | 2.0 | 2.0 | 6.0 | 6.0 |

TABLE 4

|  |  |  | CE1 | CE2 | CE3 | CE4 | CE5 | CE6 |
|---|---|---|---|---|---|---|---|---|
| Ink |  |  | B-1 | B-2 | B-3 | B-4 | B-5 | B-6 |
| Pigment composition | Pigment | Type | PR122 | PR122 | PR122 | PR122 | PR122 | PR122 |
|  |  | Percentage content (wt %) | 95 | 95 | 95 | 95 | 98 | 85 |
|  | Derivative | Type | 1-1 | 1-1 | 1-1 | 1-1 | 1-1 | 1-1 |
|  |  | Percentage content (wt %) | 5 | 5 | 5 | 5 | 2 | 15 |
| Sulfur concentration (ppm) |  |  | 1.3 | 1.3 | 1.3 | 1.3 | 0.3 | 8.0 |
| Dispersion | Discharge amount (g/min) |  | 850 | 250 | 700 | 700 | 350 | 350 |
| Non-adsorption resin rate (wt %) |  |  | 55 | 15 | 50 | 50 | 30 | 30 |
| Ultrafiltration | Circulation time (min) |  | 30 | 30 | 0 | 120 | 60 | 60 |
| Phosphorous concentration (ppm) |  |  | 6.0 | 6.0 | 8.0 | 0.8 | 2.0 | 2.0 |

(Acid Value Measurement)

The aforementioned acid value of the pigment dispersion resin (R1) was measured in accordance with the "Japanese Industrial Standard (JIS) K0070:1992".

(Mass Average Molecular Weight Measurement)

The aforementioned mass average molecular weight of the pigment dispersion resin (R1) was measured under the following measurement conditions using a gel permeation chromatography ("HLC-8020GPC", product of Tosoh Corporation). Using n-propylbenzene and F-40, F-20, F-4, F-1, The terms in Tables 3 and 4 and Tables 7 and 8 described later are as follows. "E" indicates Example. "CE" indicates Comparative Example. "Pigment" indicates a quinacridone pigment. "Percentage content" in the row "Pigment" indicates the content percentage of the quinacridone pigment to the total mass of the quinacridone pigment and the sulfur-containing pigment derivative. "PR122" indicates C.I. Pigment Red 122. "PV19" indicates C.I. Pigment Violet 19. "Derivative" indicates a sulfur-containing pigment derivative. "Percentage content" in the row "Derivative" indicates a derivative content rate, that is, a percentage content of the sulfur-containing pigment derivative to the total mass of the quinacridone pigment and the sulfur-containing pigment derivative. "Sulfur concentration" indicates the specific sulfur concentration. "Discharge amount" in the row "Dispersion" indicates a discharge amount in a bead mill in dispersion carried out in pigment dispersion preparation described later. "Circulation time" in the row "Ultrafiltration" indicates a circulation time in ultrafiltration described later. "Phosphorous concentration" indicates the specific phosphorous concentration.

<Preparation of Ink (A-1)>
(Preparation of Pigment Composition (P1))

A mixed liquid A was obtained by mixing 5 parts by mass of methanol and a wet cake of a quinacridone pigment (C.I. Pigment Red 122) with a solid content of 95 parts by mass. The full amount of the mixed liquid A and 5 parts by mass of the sulfur-containing pigment derivative (1-1) were mixed to obtain a mixed liquid B. Methanol was distilled from the mixed liquid B under reduced pressure at 80° C. to obtain a residue. The residue was filtered with water and dried at 80° C. to obtain a dried product. The dried product was pulverized using a COUNTER JET MILL (registered Japanese trademark) produced by Hosokawa Micron Corporation to obtain a pigment composition (P1). The derivative content rate in the pigment composition (P1) was 5% by mass.

(Pigment Dispersion Preparation)

A pigment dispersion was prepared to have a blending rate d-a shown in Table 5.

TABLE 5

| Pigment dispersion | Blending rate d-a [part by mass] |
|---|---|
| Water | Rest |
| Pigment dispersion resin (R1) | 6.0 |
| Sodium hydroxide | Predetermined amount |
| Pigment composition (P1) | 15.0 |
| OLFINE E1010 | 0.5 |
| Total | 100.0 |

First, 6.0 parts by mass of the pigment dispersion resin (R1) and an aqueous solution of sodium hydroxide were mixed. The aqueous solution of sodium hydroxide contained a predetermined amount of sodium hydroxide. The "predetermined amount" in Table 5 being an amount of sodium hydroxide added indicates an amount that is 1.05 times the amount necessary for equivalent neutralization of the pigment dispersion resin (R1). In the manner described above, the pigment dispersion resin (R1) was neutralized with an equivalent amount (strictly, 105% equivalent amount) of sodium hydroxide to obtain an aqueous solution C containing the pigment dispersion resin (R1).

The full amount of the resultant aqueous solution C, 15.0 parts by mass of the pigment composition (P1), 0.5 parts by mass of a nonionic surfactant, and the remaining amount of water were added into a vessel. The nonionic surfactant used was "OLFINE (registered Japanese trademark) E1010 (product of Nissin Chemical Industry Co., Ltd., ethylene oxide adduct of acetylenediol, effective component concentration: 100% by mass, HLB value: 13.5±0.5). The vessel contents were mixed using a media type wet disperser ("DYNO (registered Japanese trademark) MILL", product of Willy A. Bachofen AG) to obtain a mixed liquid D.

Note that "Rest" in Table 5 being an amount of water added means an amount that makes the mixed liquid D 100.0 part by mass. The amount of the remaining water in Table 5 is the total amount of water added into the vessel and water (specifically, water contained in the aqueous solution of sodium hydroxide used for resin neutralization and water produced through neutralization between the resin and the sodium hydroxide) contained in the aqueous solution C.

The mixed liquid D was dispersed using a zirconia beads (particle diameter 0.5 mm) as a medium and a bead mill ("NANO GRAIN MILL", product of ASADA IRON WORKS.CO., LTD.). The dispersion using the bead mill was carried out under conditions of a temperature of 10° C. and a peripheral speed of 8 m/sec. In the dispersion, the discharge amount of the bead mill was set to 300 g/min. Through the above, a pre-ultrafiltration pigment dispersion E was obtained.

(Ultrafiltration)

The pigment dispersion E was filtered by vibrating ultrafiltration. In detail, using an ultrafiltration membrane, 480 g of the pigment dispersion E was circulated at a flow rate of 390 g/min for 2.0 hours under a condition that the internal pressure applied to the ultrafiltration membrane was 50 kPa. That is, the circulation time was 2.0 hours. The ultrafiltration membrane used was an UF pencil type module ("AHP-0013D", product of Asahi Kasei Corp., material of hollow fiber membrane: polyacrylonitrile, film inner diameter: 0.8 mm, effective film area: 170 cm$^2$). By the ultrafiltration, liquid containing at least a portion of the phosphorous-containing catalyst was discharged as filtrate while liquid containing the components of the pigment dispersion other than that was re-circulated as recovered liquid. The solid concentration of the pigment dispersion was kept constant by adding to the recovered liquid an equal amount of water to the amount of the discharged filtrate. In the manner described above, a post-ultrafiltration pigment dispersion F was obtained.

(Ink Preparation)

An ink (A-1) was prepared to have a blending rate i-a shown in Table 6.

TABLE 6

| Ink | Blending rate i-a [part by mass] |
|---|---|
| Pigment dispersion | 40.0 |
| SURFYNOL 420 | 0.3 |
| Triethylene glycol monobutyl ether | 4.0 |
| 3-Methyl-1,5-pentanediol | 20.0 |
| Glycerin | 5.0 |
| Water | Rest |
| Total | 100.0 |

Water was added into a flask equipped with a stirrer ("THREE-ONE MOTOR (registered Japanese trademark) BL-600, product of Shinto Scientific Co., Ltd.). The pigment dispersion F as a result of the ultrafiltration, a nonionic surfactant, triethylene glycol monobutyl ether, 3-methyl-1, 5-pentanediol, and glycerin were added to the flask contents under stirring by the stirrer at a stirring speed of 400 rpm to obtain a mixed liquid G. The nonionic surfactant used was "SURFYNOL (registered Japanese trademark) 420" (product of Nissin Chemical Industry Co., Ltd., ethylene oxide adduct of acetylene glycol, effective component concentration: 100% by mass, HLB value: 4). The amounts of the raw materials added were as shown in Table 6. "Rest" in Table 6 being an amount of water added means an amount that makes the mixed liquid G 100.0 part by mass. The mixed liquid G was filtered using a filter with a pore sized of 5 μm to remove foreign matter and coarse particles from the mixed liquid G. Through the above, an ink (A-1) was obtained.

<Preparation of Inks (A-2) to (A-9) and (B-1) to (B-6)>

Inks (A-2) to (A-9) and (B-1) to (B-6) were prepared according to the same method as that for preparing the ink (A-1) in all aspects other than the following changes. In the preparation of the pigment composition (P1), the type and percentage content of the quinacridone pigment and the type and percentage content of the sulfur-containing pigment derivative were changed to those shown in Tables 3 and 4. Note that these changes changed the specific sulfur concentration as shown in Tables 3 and 4. In the dispersion carried out in the pigment dispersion preparation, the discharge amount of the bead mill was changed to those shown in Tables 3 and 4. Note that the change in the discharge amount of the bead mill changed the non-adsorption resin rate as shown in Tables 3 and 4. The circulation time in the ultrafiltration was changed to those shown in Tables 3 and 4. Note that the change in the circulation time in the ultrafiltration changed the specific phosphorous concentration as shown in Tables 3 and 4.

Measurement

Each of the inks (specifically, each of the inks (A-1) to (A-9) and (B-1) to (B-6)) was centrifugated by the following method. With respect to each of the resultant supernatants, the specific phosphorous concentration, the specific sulfur concentration, the non-adsorption resin rate, and the supernatant specific absorbance were measured then. The specific phosphorous concentration, the specific sulfur concentration, and the non-adsorption resin rate are shown above in Tables 3 and 4 and also shown below in Tables 7 and 8 for facilitating understanding. The supernatant specific absorbance is shown below in Tables 7 and 8.

<Centrifugation>

In an environment at 23° C., centrifugation was carried out on 2 g of the ink sealed in a container for 3 hours using an ultracentrifuge ("HIMAC (registered Japanese trademark) CS150FNX", product of Eppendorf Himac Technologies Co., Ltd., rotor: S140AT) at a rotational speed of 140,000 rpm (corresponding to a centrifugal force of 1,050,000 G). As a result, pigment particles contained in the ink was precipitated.

<Specific Phosphorous Concentration>

Using a syringe, 1 mL of the supernatant of the ink after the centrifugation was collected. The collected supernatant was diluted with water 50 times and the resultant was taken as a measurement sample. The measurement sample was measured using a high-frequency inductively coupled plasma (ICP) mass spectrometer ("iCAP PRO ICP-OES Duo", product of Thermo Fisher Scientific K.K.). The measurement value (phosphorous concentration of the 50-fold dilution of the supernatant) of the measurement sample was multiplied by 50 to convert to a phosphorous concentration (unit: ppm) in the supernatant. The phosphorous concentration in the supernatant was taken as a specific phosphorous concentration (unit: ppm). Note that in the calculation of the phosphorous concentration, a calibration curve plotted using a sample with a known phosphorous concentration was used.

<Specific Sulfur Concentration>

Using a syringe, 1 mL of the supernatant of the ink after the centrifugation was collected. The collected supernatant was diluted with water 50 times and the resultant was taken as a measurement sample. The measurement sample was measured using a high-frequency inductively coupled plasma (ICP) mass spectrometer ("iCAP PRO ICP-OES Duo", product of Thermo Fisher Scientific K.K.). The measurement value (sulfur concentration of the 50-fold dilution of the supernatant) of the measurement sample was multiplied by 50 to convert to a sulfur concentration (unit: ppm) in the supernatant. The sulfur concentration in the supernatant was taken as a specific sulfur concentration (unit: ppm). Note that in the calculation of the sulfur concentration, a calibration curve plotted using a sample with a known sulfur concentration was used.

<Non-Adsorption Resin Rate>

The full amount of the supernatant of the ink after the centrifugation was collected. Next, the full amount of the collected supernatant was dried under reduced pressure at 60° C. for 24 hours to obtain a residue. A mass (WA) of the residue was measured. The measured mass (WA) of the residue was regarded as the mass of the non-adsorption resin.

A mass (WD) of the pigment dispersion resin contained in 2 g of the ink was calculated using the following equation based on a percentage content B (=6.0% by mass) of the pigment dispersion resin (R1) in the pigment dispersion read from Table 5 and a percentage content C (=40.0% by mass) of the pigment dispersion in the ink read from Table 6.

$$WD=2\times(C/100)\times(B/100)$$

Thereafter, a non-adsorption resin rate was calculated using the following equation based on the mass (WA) of the residue obtained from 2 g of the ink and the mass (WD) of the pigment dispersion resin contained in 2 g of the ink.

$$\text{Non-adsorption resin rate[\% by mass]}=100\times WA/WD$$

<Specific Absorbance>

Using a syringe, the full amount of the supernatant of the ink after the centrifugation was collected. The collected supernatant was diluted 25 times with water and the resultant was taken as a measurement sample. The measurement sample placed in a cell was measured using a spectrophotometer ("U-3000", product of Hitachi High-Tech Science Corporation) under the following conditions to plot an UV-visible absorption spectrum of the measurement sample. From the UV-visible absorption spectrum, the absorbance of the specific peak of the measurement sample was determined. Note that the specific peak was recognized at a wavelength of 320 nm. The absorbance of the specific peak of the measurement sample (i.e., the 25-fold dilution of the supernatant) was multiplied by 25 to convert to a specific absorbance of the supernatant.

(Absorbance Measurement Conditions)
  Measured wavelength range: range between 200 nm and 800 nm
  Scanning speed: 300 nm/min
  Sampling intervals: 1 nm
  Slit width: 1 nm
  Cell: quartz glass cell
  Optical path length: 10 mm
  Beam: double beam
  Base line measurement: done
  Reference: water Evaluation With respect to each of the inks (A-1) to (A-9) and (B-1) to (B-6), ejection performance, scratch resistance, re-solubility, and dispersion stability were evaluated according to the following methods. In the following description of the evaluation methods, each of the inks (A-1) to (A-9) and (B-1) to (B-6) may be also referred to below simply as an "ink". The evaluation results are shown below in Tables 7 and 8.

<Evaluation Apparatus, etc.>

An inkjet recording apparatus (prototype produced by KYOCERA Document Solutions Japan Inc.) was used as an evaluation apparatus. The evaluation apparatus included line heads of piezoelectric type with nozzles (radius of orifices: 10 μm) as recording heads. "C2" (product of FUJIFILM Business Innovation Corp., A4-size plain paper) was used as paper.

<Ejection Performance>

Evaluation of ejection performance of each ink from a recording head was carried out in an environment at a temperature of 25° C. and a relative humidity of 60%. The ink was set in a recording head for magenta ink use of the evaluation apparatus. The temperature of each recording head was set at 40° C. The ejection amount of the ink per one pixel was set to 3.5 pL.

Using the evaluation apparatus, printing of an image (20.5 mm×29.0 mm) on sheets of the paper was carried out continuously for 1 hour. Here, the image was an image obtained at an image processing setting in which ink ejection is performed from all the nozzles of the recording head. An image (initial image) printed first in the continuous printing and an image (post-printing image) printed the last in the continuous printing were observed with naked eye. The presence or absence of a white line in the initial image and the post-printing image was checked. The white line is an image defect resulting from skewed ink ejection from a recording head. Ejection performance of the ink from the recording head was evaluated according to the following criteria. It was determined that inks rated as good in evaluation of ejection performance had inhibited skewed ink ejection from the recording head.

(Criteria of Ejection Performance)

Good (A): A white line had been caused less in the post-printing image than in the initial image.

Poor (B): A white line had been caused more in the post-printing image than in the initial image.

<Scratch Resistance>

Evaluation of scratch resistance was carried out in an environment at a temperature of 25° C. and a relative humidity of 60%. The ink ejection amount per one pixel was set to 11 pL. Using the evaluation apparatus, a solid image (4 cm×5 cm) was printed on one sheet (also referred to below as sheet A) of the paper. Next, a rubbing test described below was carried out. In the rubbing test, a non-used sheet (also referred to below as a sheet B) of the paper was laid over the solid image printed on the sheet A. Next, a 1-kg weight was placed on the sheet B. Thereafter, the sheet B was rubbed back and forth 5 times against the solid mage A by moving the sheet B together with the weight so as to apply the weight's own weight. After the rubbing test, the image density of 224 locations in an area of the sheet A where the solid image has not been formed was measured using a reflectance densitometer ("RD-19", product of X-Rite Inc.). The highest value of the measured image densities was taken as an evaluation value. A lower evaluation value indicates less color transfer due to rubbing and more excellent scratch resistance of the image. Scratch resistance of the images formed with the inks was evaluated according to the following criteria.

(Criteria of Scratch Resistance)

A (good): evaluation value of less than 0.020

B (poor): evaluation value of at least 0.020

<Re-Solubility>

With respect to each of the inks, 0.3 mL of the ink was placed on the tip end of a wiper of the evaluation apparatus and left to stand for 10 minutes in an environment at a temperature of 25° C. and a relative humidity of 60%. Next, the ink was spread over the ejection surface of the recording head by wiping the ejection surface in the outward direction (direction opposite to the wiping direction D3 in FIG. 4) using the wiper with the ink thereon. The spread ink was dried for 4 days at 45° C. to form dried ink on the ejection surface.

After the dried ink formation, the cleaning operation was carried out using the evaluation apparatus. In detail, non-woven fabric impregnated with 3 g of a cleaning solution was attached to the ejection surface of the recording head for 30 seconds (corresponding to the cleaning solution supply operation). The cleaning solution used was a cleaning solution for head cleaning use to be used in an inkjet color production printer "TASKalfa Pro 15000c" produced by KYOCERA Document Solutions Japan Inc. The non-woven fabric used was a cut product of "BEMCOT (registered Japanese trademark) M-3II" produced by Asahi Kasei Corp. Next, the non-woven fabric was separated from the ejection surface of the recording head. Next, 0.3 mL of the ink was forcedly discharged (purged) from the recording head (corresponding to the purging operation). Next, the ejection surface of the recording head was wiped in the return direction (the wiping direction D3 in FIG. 4) using the wiper (corresponding to the wiping operation). In the manner described above, the dried ink attached to the ejection surface of the recording head was removed together with the cleaning solution and the purged ink. Details of the cleaning operation carried out in the present test is almost the same as the cleaning operation described with reference to FIGS. 3 and 4. Next, the ejection surface of the recording head was observed with naked eye to check the presence or absence of remaining dried ink that had not been cleaned. Note that the more easily the dried ink dissolves in the cleaning solution and the purged ink, the more easily the dried ink attached to the ejection surface of the recording head tends to be removed. Re-solubility of the inks was evaluated according to the following criteria.

(Criteria of Re-Solubility)

Good (A): No dried ink had been observed on the ejection surface of the recording head.

Poor (A): Dried ink had been observed on the ejection surface of the recording head.

<Dispersion Stability>

Each of the inks was diluted 100 times with water and the resultant was taken as a measurement sample. The volume median diameter of the pigment particles of the measurement sample was measured using a dynamic light scattering type particle size distribution analyzer ("ZETASIZER (registered Japanese trademark) NANO ZS", product of Malvern Instruments Ltd.). The volume median diameter of the pigment particles of the measurement sample was regarded as the volume median diameter ($D_{50}$) of the pigment particles included in the ink.

(Criteria of Dispersion Stability)

Good (A): volume median diameter of pigment particles of less than 140 nm

Poor (B): volume median diameter of pigment particles of at least 140 nm

TABLE 7

|  |  | E1 | E2 | E3 | E4 | E5 | E6 | E7 | E8 | E9 |
|---|---|---|---|---|---|---|---|---|---|---|
| Ink |  | A-1 | A | A-3 | A-4 | A-5 | A-6 | A-7 | A-8 | A-9 |
| Non-adsorption resin rate (wt %) |  | 30 | 50 | 20 | 50 | 50 | 30 | 30 | 30 | 30 |
| Specific absorbance |  | 0.24 | 0.27 | 0.16 | 0.21 | 0.35 | 0.16 | 0.16 | 0.24 | 0.24 |
| Sulfur concentration (ppm) |  | 1.3 | 1.3 | 1.3 | 1.3 | 1.3 | 2.0 | 6.0 | 1.3 | 1.3 |
| Phosphorous concentration (ppm) |  | 6.0 | 2.0 | 6.0 | 1.0 | 6.0 | 2.0 | 2.0 | 6.0 | 6.0 |
| Ejection performance |  | A | A | A | A | A | A | A | A | A |
| Scratch resistance | $ID_{MAX}$ | 0.015 | 0.010 | 0.019 | 0.010 | 0.010 | 0.015 | 0.015 | 0.015 | 0.015 |
|  | Rating | A | A | A | A | A | A | A | A | A |
| Re-solubility |  | A | A | A | A | A | A | A | A | A |
| Dispersion stability | $D_{50}$ (nm) | 130 | 127 | 128 | 127 | 130 | 120 | 110 | 130 | 130 |
|  | Rating | A | A | A | A | A | A | A | A | A |

TABLE 8

|  |  | CE1 | CE2 | CE3 | CE4 | CE5 | CE6 |
|---|---|---|---|---|---|---|---|
| Ink |  | B-1 | B-2 | B-3 | B-4 | B-5 | B-6 |
| Non-adsorption resin rate (wt %) |  | 55 | 15 | 50 | 50 | 30 | 30 |
| Specific absorbance |  | 0.50 | 0.12 | 0.40 | 0.14 | 0.24 | 0.24 |
| Sulfur concentration (ppm) |  | 1.3 | 1.3 | 1.3 | 1.3 | 0.3 | 8.0 |
| Phosphorous concentration (ppm) |  | 6.0 | 6.0 | 8.0 | 0.8 | 2.0 | 2.0 |
| Ejection performance |  | B | A | B | A | A | B |
| Scratch resistance | $ID_{MAX}$ | 0.008 | 0.030 | 0.010 | 0.010 | 0.015 | 0.015 |
|  | Rating | A | B | A | A | A | A |
| Re-solubility |  | A | A | A | B | A | A |
| Dispersion stability | $D_{50}$ (nm) | 127 | 128 | 127 | 127 | 140 | 108 |
|  | Rating | A | A | A | A | B | A |

As shown in Table 8, the ink (B-1) had a non-adsorption resin rate of greater than 50% by mass. The ink (B-3) had a specific phosphorous concentration of greater than 6.0 ppm. The ink (B-6) had a specific sulfur concentration of greater than 6.0 ppm. As shown in Table 8, the inks (B-1), (B-3), and (B-6) were rated as poor in evaluation of ejection performance.

As shown in Table 8, the ink (B-2) had a non-adsorption resin rate of less than 20% by mass. The ink (B-2) was rated as poor in evaluation of scratch resistance.

As shown in Table 8, the ink (B-4) had a specific phosphorous concentration of less than 1.0 ppm. The ink (B-4) was rated as poor in evaluation of re-solubility.

As shown in Table 8, the ink (B-5) had a specific sulfur concentration of less than 1.0 ppm. The ink (B-5) was rated as poor in evaluation of dispersion stability.

As shown in Table 7, the inks (A-1) to (A-9) each had the following features. The non-adsorption resin rate was at least 20% by mass and no greater than 50% by mass. The specific phosphorous concentration was at least 1.0 ppm and no greater than 6.0 ppm. The specific sulfur concentration was at least 1.0 ppm and no greater than 6.0 ppm. As shown in Table 7, the inks (A-1) to (A-9) were all evaluated as good in evaluation of ejection performance, scratch resistance, re-solubility, and dispersion stability.

From the above, it is determined that with the ink of the present disclosure encompassing the inks (A-1) to (A-9): occurrence of skewed ink ejection from a recording head can be inhibited; images with excellent scratch resistance can be formed; the ink can be excellent in re-solubility; and the quinacridone pigment therein can be excellent in dispersibility. It is also determined that with the inkjet recording apparatus of the present disclosure using the ink as described above: occurrence of skewed ink ejection from a recording head can be inhibited; images with excellent scratch resistance can be formed; the ink can be excellent in re-solubility; and the quinacridone pigment therein can be excellent in dispersibility.

What is claimed is:

1. An inkjet ink comprising:
a quinacridone pigment;
a pigment dispersion resin; and
an aqueous medium, wherein
the pigment dispersion resin includes an adsorption resin adsorbed to the quinacridone pigment and a non-adsorption resin not adsorbed to the quinacridone pigment,
the non-adsorption resin has a percentage content in the pigment dispersion resin of at least 20% by mass and no greater than 50% by mass,
a supernatant obtained by centrifugation of the inkjet ink at 1,050,000 G for 3 hours has a phosphorous concentration of at least 1.0 ppm and no greater than 6.0 ppm, and
the supernatant has a sulfur concentration of at least 1.0 ppm and no greater than 6.0 ppm.

2. The inkjet ink according to claim 1, further comprising a sulfur compound represented by formula (1), wherein the sulfur concentration is a concentration of a sulfur atom of the sulfur compound represented by the formula (1):

[Chemical formula 1]

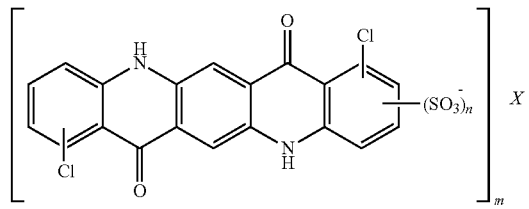

(1)

where in the formula (1), n represents an integer of at least 1 and no greater than 3, m represents an integer of at least 1 and no greater than 3, and X represents a metal ion.

3. The inkjet ink according to claim 2, wherein in the formula (1), X represents $Al^{3+}$ or $Mg^{2+}$.

4. The inkjet ink according to claim 2, wherein the sulfur compound represented by the formula (1) has a percentage content to total mass of the quinacridone pigment and the sulfur compound represented by the formula (1) of at least 5% by mass and no greater than 12% by mass.

5. The inkjet ink according to claim 1, wherein the phosphorous concentration is a concentration of a phosphorous atom derived from a phosphorous-containing catalyst used for synthesis of the quinacridone pigment.

6. The inkjet ink according to claim 1, wherein the phosphorous concentration is a concentration of a phosphorous atom of at least one selected from the group consisting of polyphosphoric acid and a derivative thereof.

7. The inkjet ink according to claim 1, wherein the pigment dispersion resin includes at least one repeating unit derived from (meth)acrylic acid, at least one repeating unit derived from (meth)acrylic acid alkyl ester, and a repeating unit derived from styrene.

8. The inkjet ink according to claim 1, wherein on an UV-visible absorption spectrum of the supernatant, a specific peak has an absorbance of at least 0.15 and no greater than 0.40, the specific peak being a maximum peak in a wavelength range of the UV-visible absorption spectrum of at least 300 nm and no greater than 340 nm.

9. An inkjet recording apparatus comprising:
a conveyance section that conveys a recording medium; and
a recording head that ejects an ink toward the recording medium, wherein
the ink is the inkjet ink according to claim 1.

10. The inkjet recording apparatus according to claim 9, wherein
the recording head is a line head.

* * * * *